United States Patent Office 2,773,057
Patented Dec. 4, 1956

2,773,057

METHOD OF PREPARING STARCH ETHER DERIVATIVES AND NEW STARCH ETHER DERIVATIVES PRODUCED THEREBY

Erling T. Hjermstad and Carl C. Kesler, Cedar Rapids, Iowa, assignors to Penick & Ford, Ltd., Incorporated, Cedar Rapids, Iowa, a corporation of Delaware No Drawing. Application February 20, 1952,
Serial No. 272,712

10 Claims. (Cl. 260—233.3)

This invention relates to a method of preparing starch ether derivatives and to new starch ether derivatives produced thereby. The new starch ether derivatives produced by the method of this invention are characterized by having the starch in its original, unswollen, granule form, while at the same time being more susceptible to swelling in the presence of water and tending to gelatinize at considerably lower temperatures than unmodified starch of the same type.

Starch occurs in nature in the form of characteristically shaped particles called granules. These granules are insoluble in cold water and do not become appreciably hydrated or swollen until the temperature of the water is raised to above 65° C. The insolubility of starch granules in water at lower temperatures is of considerable economic importance because starch occurs in nature in intimate association with other materials such as protein, fiber, mineral salts, oils, and other carbohydrates. Due to the insolubility of the starch granules these materials are fairly easily removed by various wet-processing operations and the starch granule suspension may be readily dewatered to form a cake in a filter and then washed to a high degree of purity and dried without significant losses or changes in physical state. Due to its comparative ease of separation and purification in granular form, starch is a relatively low cost material, and is consequently utilized in large quantities in numerous industrial applications.

Since naturally occurring starch does not have the required physical characteristics necessary for utilization in many industrial applications various chemical treatments are made which result in starches having greatly altered paste characteristics when cooked or gelatinized in water. It has been standard practice for many years to conduct such chemical treatments on the unswollen starch granules either when in suspension in water at low or moderate temperatures or at high temperatures in the presence of a limited proportion of water which is insufficient to swell the starch. The chemical reactions which can be conducted on unswollen granule starch in low temperature suspensions are particularly convenient and economical since the starch may be treated at some stage during its wet-processing, then dewatered, washed, and dried in the same manner as untreated starch. The large scale economical production of such modified starches is possible because of the insolubility of the starch granules at low or moderate temperatures and the relative ease with which they may be dewatered and dried. If starch granules once become swollen or gelatinized it is impossible to reverse the action and obtain the original cold-water insoluble granule state. It is very difficult and costly to purify and dry starch which is in the swollen or gelatinized state. Such starch binds water too tenaciously to allow dewatering in commercial filters. While a relatively small amount of starch is commercially processed by gelatinizing or heated rolls and grinding the dried film to a powder, the product does not have the original, cold-water insoluble, granule form, but rehydrates immediately when wet to form a paste which contains swollen aggregates of starch which result in a coarseness or rough texture and low adhesive power. Such products, when cooked with heat, do not attain the smoothness, homogeneity and adhesive power that is obtained when pastes are made by gelatinizing starch in its native granule form. Such pre-cooked or pre-gelatinized starches require special processing equipment for their manufacture and have limited usage.

It has been known for many years that etherifying agents can be made to react monofunctionally with gelatinized starch to produce starch-ether derivatives having varying degrees of substitution of alkyl groups for the hydroxyl hydrogens of the starch. Practically all of these reactions are accomplished by the action of aqueous alkali such as sodium or potassium hydroxide solutions. Since starch granules are readily swollen and gelatinized by relatively low concentrations of strong alkali in cold water and since the monofunctional substitution of ether groups in starch usually greatly increases the susceptibility of the starch to swelling by the action of heat or alkali, it has generally been considered impossible to obtain such ether derivatives in the unswollen, granule state when such reactions are conducted in water, except in the case of certain highly reactive etherifying agents which require only very low concentrations of alkali to produce etherification, as indicated below. Therefore, due to the difficulty and high cost of purifying and drying gelatinized starch, such swollen, etherified derivatives, though extensively described in patents and other scientific and technical literature, have not been produced and marketed to any great extent.

The present state of the art of producing monofunctionally substituted ether derivatives of unswollen, granule starch is illustrated by U. S. Patent No. 2,516,633, in which the highly reactive alkylene oxides and halohydrins are reacted in water suspensions under conditions of temperature and alkalinity sufficiently low to prevent swelling of the etherified product. The temperature and alkalinity recommended in the process disclosed in this patent ranges from 120–130° F. and .008 to .02 mole of NaOH per $C_6H_{10}O_5$ mole of starch, when such reactions are conducted in high solids water suspensions of starch. While such alkylene oxides or halohydrins will combine with unswollen, granule starch under these conditions, all attempts to secure useful starch ether derivatives by reacting monochlorine substituted hydrocarbons or monochlorine substituted fatty acid salts with starch under these conditions were unsuccessful, due to their high resistance to alkaline hydrolysis. Though it has been known for many years that monochlorine substituted hydrocarbons and monochlorine substituted fatty acid salts will combine with gelatinized starch under conditions of high alkalinity to yield products with desirable paste characteristics, such gelatinized starch alkyl ether derivatives have not been produced commercially to any significant extent because of the difficulty and cost of purification and drying and because gelatinized, dried starch products do not have the commercial utility possessed by starch in its original granule form, as explained above. There has therefore been a definite need for a method of securing alkyl ether derivatives of unswollen granule starch through etherification with the difficultly hydrolyzable alkyl chlorides, since many of these compounds are relatively low in cost and abundant. To our knowledge no process for securing these results has heretofore been disclosed.

The object of this invention is the production of monofunctionally substituted partial alkyl ethers of unswollen, granule starch by reaction of monochlorine substituted organic compounds reacting monofunctionally with starch in which the chlorine is attached to a single bonded carbon atom in an aliphatic chain.

Another object of this invention is to prepare water suspensions of unswollen, granule starch containing sufficient dissolved alkali metal hydroxides to cause monochlorine substituted organic compounds, in which the chlorine is attached to a single bonded carbon atom, to combine with the starch to yield partial ether derivatives in the unswollen, granule form.

A further object of this invention is to prepare monofunctionally substituted partial alkyl ethers of unswollen, granule starch which are characterized by lowered swelling temperatures, increased rate of granule dispersion of cooking, increased paste translucency and cohesiveness, decreased tendency of their cooked pastes to retrograde and form gels on cooling and ageing, and increased clarity and smoothness of films formed from their cooked pastes.

Further objects and advantages will appear as the specification proceeds.

The invention is based on the discovery that certain monochlorine substituted organic compounds, for example methyl chloride, ethyl chloride, benzyl chloride, allyl chloride, and sodium monochloracetate will combine efficiently and at a relatively high rate with highly alkaline, unswollen granule starch when it is suspended in water in high solids concentrations at elevated temperatures. In addition, it has been discovered that very small proportions of such etherifying agents effect considerable changes in the paste and film properties of the starches so treated. For example, by the monofunctional etherification of unswollen, granule corn starch with from .01 to .06 mole of alkyl ether groups per $C_6H_{10}O_5$ mole of starch a product is obtained which gelatinizes at lower temperatures than regular corn starch and rapidly disintegrates toward true colloidal state when cooked. The cooked pastes of this product are characterized by a high degree of translucency and cohesiveness as compared with the cloudy, relatively "short" or non-cohesive state of regular corn starch pastes. On cooling and ageing the cooked pastes of this product are relatively free from retrogradation tendencies and retain their translucent and cohesive state, while regular corn starch pastes rapidly become cloudy and then opaque and set to firm gels which resist redispersion to their original fluid state.

In order to accomplish a useful degree of etherification of starch by means of monochlorine substituted hydrocarbons and monochlorine substituted fatty acid salts we have found it necessary to conduct the reactions under conditions of temperature and alkalinity much higher than has heretofore been considered possible when treating water suspensions of unswollen, granule starch. Swelling or gelatinization of the etherified product is prevented by addition of suitable gelatinization inhibitors, preferably sodium chloride, which is cheap and abundant and which is inert to the action of the reagents required in the process and which does not produce undesirable thickening effects in high solids suspensions of unswollen, granule starch. Other gelatinization inhibitors, in general the salts of alkali metals (sodium, potassium, and lithium) may be used, though care must be exercised in their use in order to avoid undersirable side reactions or thickening effects. For example, alkali metal thiocyanathes, iodides, bromides, and salicylates will function as gelatinization inhibitors when present in relatively low concentrations but tend to gelatinize starch in high concentrations. Acid salts will function as gelatinization inhibitors but their use is less desirable since alkali is consumed as the acidity of the salt is neutralized. Salts having other chemical properties such as oxidizing or reducing characteristics may be used though such chemical activity is not required in the present process. Certain salts such as sodium tetraborate and sodium sulfate may be used, though their use is less desirable due to thickening effects on high solids suspensions of unswollen, granule starch. Salts which exhibit alkalinity when dissolved in water also function as gelatinization inhibitors, though their effectiveness varies considerably.

More specifically, fairly satisfactory results can be obtained by employing sodium, potassium or lithium chlorides, carbonates, acetates, nitrates, or sulfates, but sodium chloride is by far the most desirable swelling inhibitor for the reasons given above.

While it has been previously known that sodium sulfate, traces of which are sometimes present in commercial grades of starch, exhibits some tendency to inhibit swelling of starch, it has not been known that this property is common to alkali metal salts; or that by employing a sufficient amount of an alkali metal salt the swelling of starch can be inhibited to an extent great enough to permit unswollen, granule, starch to be etherified with a monochlorine substituted organic compound reacting mono-functionally with the starch without gelatinizing the starch. Still less has it been suspected that inexpensive sodium chloride is the ideal salt for this purpose. As previously indicated rather stringent temperature and alkalinity conditions are required to hydrolyze a chlorine atom attached to a single bonded carbon atom in a monochlorine substituted organic compound, and the starch must be in an aqueous suspension for the etherification reaction to proceed at a satisfactory rate. Exposure of unswollen, granule starch to the combined action of high temperatures and a highly alkaline aqueous medium, where the temperature is high enough and the alkalinity strong enough to promote the reactivity of the hydroxyl group of the starch molecules with mono-functionally reacting organic monochlorides would have been expected to lead to the complete gelatinization of the starch long before the completion of the etherification reaction. In fact, this result was invariably obtained prior to the present invention. It is therefore surprising that the swelling and ultimate gelatinization of starch can be inhibited sufficiently by the use of an alkali metal salt to permit inexpensive reagents, such as methyl, ethyl, and allyl chlorides, to be reacted with unswollen, granule starch without gelatinizing the starch.

The etherification of unswollen, granule starch is accomplished by the following general process: The starch is suspended in water at a temperature below the normal gelatinization temperature range of the starch. The gelatinization inhibitor may either be added to the water before or after the starch or it may be added simultaneously with the alkali. In any case the inhibitor should be present as the alkali is added. The alkali is dissolved in water, cooled, and added with sufficient agitation of the starch suspension to insure rapid dispersion of the alkali. This is necessary in order to prevent localized extremely high concentrations of alkali which tend to swell a portion of the starch before the alkali is dispersed and uniformly distributed throughout the suspension. The suspension is preferably prepared with a water-starch ratio of 1.3 to 2.3 parts by weight of water to 1 part by weight of starch. The amount of alkali required in the suspension will depend somewhat on the etherifying agent to be used and the degree of substitution of ether groups which is desired. The etherifying agent is then added to the suspension and the mixture agitated at a suitable temperature, preferably 40° to 65° C., until the desired proportion of etherifying agent has reacted. When etherifying agents with low boiling points, such as the lower alkyl chlorides, are used it is necessary to conduct the reaction in closed, pressure-tight vessels or with suitable refluxing condensers. The course of the reaction may be determined by removing portions of the suspension at intervals and titrating with acid to determine the amount of alkali consumed by hydrolysis of the chloride radical of the etherifying agent. When the desired proportion of etherifying agent has reacted the excess alkali is neutralized with acid and the etherified starch is dewatered either in a simple gravity filter or a vacuum filter, purified by washing out the salt, and dried. The etherified starch is obtained in the original, unswollen, granule form.

The etherifying agents which have been found to be reactive to highly alkaline, unswollen granule starch and which produce starch ethers which are characterized by lowered swelling temperatures, increased rate of granule dispersion on cooking, increased translucency and cohesiveness of cooked pastes, decreased retrogradation and gelling of cooked pastes, and increased film clarity and smoothness are the monochlorine substituted organic compounds reacting monofunctionally with starch and in which the chlorine is attached to a single-bonded carbon atom in an aliphatic chain. Single-bonded carbon atoms are defined as carbon atoms to which four atoms are attached by single bonds. For example, the carbon atoms in methyl chloride

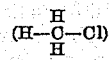

iso-propyl chloride

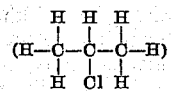

allyl chloride

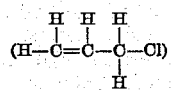

and benzyl chloride

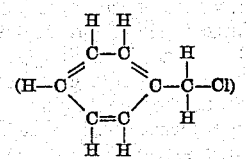

to which the chlorine is attached are single-bonded carbon atoms. These compounds will function in our process and give the results described. On the other hand, vinyl chloride

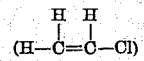

chlorobenzene

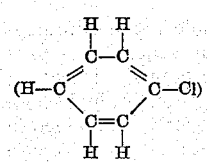

and acetyl chloride

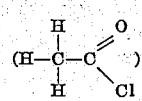

each contain a chlorine atom attached to a carbon atom having only three attached atoms, one of which is attached by a double bond. Compounds of this type are not suitable in our process and do not produce the desired results.

Other functional groups may be present in the etherifying agent, provided such groups are not reactive to alkaline, unswollen granule starch. For example, sodium monochloracetate

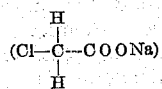

will combine with alkaline, unswollen granule starch by splitting off the chloride radical and establishing a bond between the alpha carbon atom of the etherifying agent and the starch rather than reacting through the sodium carboxy (—COONa) group. Also, allyl chloride

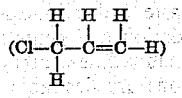

will combine with alkaline, unswollen granule starch by splitting off the chloride radical and establishing a bond between the number 3 carbon atom of the etherifying agent and the starch rather than reacting through one of the double bond carbon atoms. On the other hand, monohalogen substituted compounds which contain certain other reactive groups have been found to yield products with characteristics which are opposite to those obtained by etherification with monofunctionally reacting etherifying agents. For example, epichlorohydrin

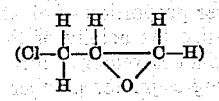

combines with alkaline, unswollen granule starch to yield products which are characterized by greatly increased resistance to gelatinization by means of heat or alkali, and greatly increased resistance to granule dispersion on cooking at elevated temperatures. Many of the products obtained by etherifying starch with such reagents cannot be gelatinized by boiling water. In general, compounds which react monofunctionally with alkaline, unswollen granule starch by hydrolysis of a chloride radical are the required class of etherifying agents in the present process.

One preferred class of etherifying agents for use in the process of this invention can be designated as monochlorine substituted hydrocarbons containing from 1 to 10 carbon atoms and in which the chlorine atom is attached to a single bonded carbon atom in an open chain. Included within this class are aromatic and alicyclic hydrocarbons having open side chains containing a chlorine atom, and open chain hydrocarbons of both the straight and branched chain types. The open side chains of the aromatic and alicyclic hydrocarbons and the open chain hydrocarbons may be either saturated or unsaturated provided the carbon atom to which the chlorine atom is bonded is not bonded by an unsaturated linkage. Saturated alkyl monochlorides containing from 1 to 5 carbon atoms and unsaturated alkyl monochlorides containing from 3 to 5 carbon atoms are especially desirable agents. Specific preferred agents are: methyl chloride, ethyl chloride, and allyl chloride.

The present process affords a means of introducing various functional groups into starch. For example, sodium carboxy-methyl groups may be introduced by etherifying with sodium monochloracetate. While sodium monochloracetate is preferred, other monochlorine substituted saturated fatty acid salts can be employed. Preferably, such etherifying agents contain from 2 to 5 carbon atoms and are in the form of their alkali metal salts. By etherifying with allyl or methallyl chloride, groups containing double bonds may be introduced. Aromatic or cyclic groups may be introduced by etherifying with aromatic or cyclic compounds containing a monochlorine substituted aliphatic side chain. Unswollen granule starch containing small proportions of such groups attached through single ether linkages exhibit a wide variety of chemical and physical properties and are useful in numerous industrial applications and as intermediates for conversion to other unusual and useful types of starch.

The use of extremely small proportions of monochlorine substituted etherifying agents in the above described process effects considerable change in the pastes of starches so treated. The use of an amount of etherifying agent of from .005 to .06 mole per $C_6H_{10}O_5$ mole of starch results in starches having improved properties. The use of lower alkyl monochlorides, such as saturated monochlorine substituted hydrocarbons and unsaturated monochlorine substituted hydrocarbons containing up to 5 carbon atoms, results in lowered gelatinization temperatures, increased paste cohesiveness and translucency, minimized retrogradation and gelling tendencies, and increased clarity and smoothness of dried films. In some cases high proportions are desirable though it is usually not feasible to react more than .15 mole of etherifying agent per $C_6H_{10}O_5$ mole of starch.

The amount of alkali required to cause the etherifying agent to combine with starch varies somewhat depending on the kind of etherifying agent which is used. Generally, alkali in excess of that required to neutralize the acidity of the chloride radical as it is removed during etherification is desirable for efficiently etherifying unswollen, granule starch. The etherification of alkaline, unswollen granule starch with methyl chloride is accomplished with a lower proportion of alkali in excess of that required to neutralize the acidity of the chloride radical as it is removed than is required for etherification with homologs containing a greater number of carbon atoms. The presence of various functional groups in the alkyl radical affects the ease with which the chloride radical may be split off by alkaline hydrolysis. For example, the etherification of alkaline, unswollen, granule starch with allyl chloride ($Cl-CH_2-CH=CH_2$) is accomplished with a lower proportion of alkali in excess of that required to neutralize the acidity of the chloride radical as it is removed than is required for etherification with propyl chloride ($Cl-CH_2-CH_2-CH_3$). The preferred amount of alkali to be used ranges from .1 to .28 mole of alkali metal hydroxide per $C_6H_{10}O_5$ mole of starch. This will generally result in the preferred excess of alkali of .095 to .275 mole of alkali metal hydroxide per $C_6H_{10}O_5$ mole of starch. While such high proportions of alkali tend to gelatinize starch in high solids suspension, the swelling of the starch or etherified product is prevented by the addition of an alkali metal salt such as sodium chloride, in proportions ranging from 1 to 6 parts by weight of salt to 1 part by weight of alkali. The term "alkali metal" as used in this specification and claims is intended to cover sodium, potassium, and lithium, while the term "alkali metal hydroxide" is intended to cover sodium, potassium, and lithium hydroxide. Sodium and potassium hydroxide are preferred.

The term "starch" as used in this specification includes the various varieties of starch and commonly manufactured modifications thereof which are produced in the cold water insoluble, unswollen, granule form. The granule structure of starch persists even during such modification treatments as acid-conversion to thin-boiling types of starch and hypochlorite oxidation.

We have found that the different varieties of starch and modifications thereof which exist in the cold water insoluble, unswollen granule form respond to the present process and produce the results described.

As previously mentioned, the etherification by alkyl halides of starch which is swollen or more or less completely gelatinized is old in the art and such reactions could be accomplished by using high proportions of strong alkali or elevated temperatures or both, since filterability of the etherified starch products is not required. In the old process the preparation of dry, powdered forms of starch-ether derivatives usually required desolvation and resulting precipitation of the swollen or gelatinized products by alcohols or other water-miscible liquids which have no tendency to swell starch. The present process, however, affords a means of preparing alkyl ether derivatives of starch in the unswollen, granule form which can be readily purified by washing on a filter and which on drying are in a form similar to regular commercial starch. Desolvation or precipitation with alcohol is not required, since the product is not solvated or swollen to the degree that would allow precipitation with alcohols.

The temperature at which the etherifications can be conducted vary somewhat, depending on the ease of hydrolysis of the particular etherifying agent employed. In general, temperatures from 25° to 65° C. are suitable. The monochlorine substituted saturated aliphatic hydrocarbons such as the lower alkyl monochlorides, and aromatic or alicyclic compounds containing a monochlorine substituted saturated aliphatic side chain are relatively difficult to hydrolyze. Therefore, when etherifying alkaline, unswollen, granule starch with such compounds temperatures ranging from 40° to 65° C. are preferable. More highly reactive monochlorides may be reacted at lower temperatures, such as 25° to 40° C., though higher temperatures are preferred because of the increased rate of reaction.

The new physical and chemical properties of certain unswollen, granule, ether derivatives of starch which can be prepared for the first time by the process of this invention make them useful in numerous industrial applications. As previously described, we can for example, prepare partially etherified, unswollen granule starch in which the substituent groups bonded to the ether oxygen atoms are unsubstituted hydrocarbons, although previously no method was known for preparing such compounds. One type of new starch ether derivative having especially desirable properties are the partially etherified unswollen granule starches in which the substituent groups bonded to the ether oxygen atoms are hydrocarbon chains containing from 1 to 10 carbon atoms. Preferably, the substituent groups are open chain hydrocarbon groups, either saturated or unsaturated, containing from 1 to 5 carbon atoms. The lowered gelatinization temperatures, increased rate of dispersion toward true colloidal state during cooking, minimized gelling and retrogradation tendencies, minimized hard size formation, and the increased film flexibility, smoothness, and ease of desizing of the etherified granule starches containing short-chain alkyl groups make them especially well suited for use as textile warp sizes. The increased film clarity and smoothness of these derivatives make them useful for finishing textile fabrics. The use of these derivatives in the sizing and coating of paper is advantageous because of their minimized gelling and retrograding tendencies, clearer films, and greater receptivity of the sized paper to printing. The hydrocarbon chains can be introduced into the starch molecule by etherification with the corresponding monochlorinated hydrocarbon in the manner previously described in detail.

Many of the granule starch saturated alkyl ether derivatives such as those in which the alkyl substituents contain from 1 to 5 carbon atoms, form pastes when gelatinized which have an exceptionally high degree of cohesiveness of "tack." This property is obtained in granule ethers of common cereal starches such as corn, wheat, or rice starch, which ordinarily gelatinize to form pastes of a "short," non-cohesive character, which rapidly retrograde and gel to semi-solids on cooling and aging. The tacky, cohesive nature of the gelatinized pastes of granule starch alkyl-ether derivatives together with their relative freedom from gelling and retrogradation tendencies make them very useful in the formulation of adhesives. These derivatives are also useful as laundry starches because of their ease of gelatinization, non-congealing paste characteristics, and their film smoothness and flexibility, which result in less harsh finishes on fabrics and lessened tendency to retain wrinkles.

Etherification of granule starch with unsaturated alkyl chlorides such as allyl or methallyl chloride results in derivatives which retain the unsaturated groups or double bonds between carbon atoms. These unsaturated groups are susceptible to various chemical actions such as oxidation, direct addition of halogens, etc. These derivatives are therefore useful as intermediates for the preparation of granule starches containing new and unusual combinations of functional groups. The allyl and methallyl ether derivatives of granule starch as prepared in the present process also gelatinize at lower temperatures and form cohesive, highly translucent pastes with minimized retrogradation and gelling characteristics and their films have increased clarity, smoothness, and ease of redissolving. The unsaturated alkyl groups introduced into the starch molecule preferably contain from 3 to 5 carbon atoms.

Granule starch ether derivatives prepared by etherifying by the present process with chlorine substituted fatty acid salts such as sodium monochloracetate or homologous compounds have the ability to become very highly hydrated when gelatinized and form pastes of very high viscosity. These derivatives are useful as thickeners in various industrial applications and as detergent adjuncts for preventing redeposition of soil. They are also useful as sizes and adhesives because of their cohesive, nongelling paste characteristics. The chlorine substituted fatty acid substituents introduced into the starch molecule preferably contain from 2 to 5 carbon atoms.

It will be understood that the etherifying agents falling within the scope of this invention as previously described may contain various functional groups. However, the etherifying agents of this invention should not contain any functional groups which are capable of reacting with starch under the reaction conditions specified herein, or more specifically with the hydroxyl groups thereof other than a single chlorine atom. In addition, the etherifying agents of this invention should be free of hydroxyl groups. For example, ethylene chlorohydrin is not intended to be included within the scope of this invention.

*Example I*

To a 43.5% dry substance water suspension of unmodified corn starch is added 10% by weight of sodium chloride based on the water in the suspension. A cool, aqueous 17% solution of sodium hydroxide containing 4% NaOH based on the starch solids in the suspension is added with sufficient agitation to insure rapid dispersion of the alkali throughout the suspension. The suspension is placed in gas tight vessel, the air above the suspension evacuated to a 25" vacuum, and methyl chloride gas admitted to the vessel and temperature raised until a pressure of 10–15 lbs. per square inch above atmospheric pressure is obtained at a temperature of 51° C. The suspension is agitated at this temperature and methyl chloride admitted to maintain a pressure of 10–15 lbs. per square inch until .05 mole of methyl chloride per $C_6H_{10}O_5$ mole of dry starch has reacted within 8 to 10 hours as determined by the amount of alkali consumed in the suspension. The suspension is neutralized to a pH of 5.0 with hydrochloric acid, dewatered to a solid cake on a suction filter, washed free of salt, and dried. The product is obtained in the original granule form. On heating a neutral water suspension the methyl granule starch starts to gelatinize at 62° C.–63° C. as compared with untreated, unmodified corn starch, which starts to gelatinize at 65° C.–66° C. On continued heating, the methyl granule starch derivative forms a cohesive, comparatively translucent paste, which on cooling has negligible retrogradation tendency and which remains fluid and translucent in concentrations at which a regular unmodified corn starch paste sets to a firm opaque gel.

*Example II*

To a 41.8% dry substance suspension of unmodified corn starch is added 20% by weight of sodium chloride based on the water in the suspension. A cool aqueous 22% solution of sodium hydroxide containing 5% NaOH based on the starch solids in the suspension is added with sufficient agitation to insure rapid dispersion of the alkali throughout the suspension. The suspension is placed in a gas-tight vessel, the air above the suspension evacuated to a 25" vacuum, and ethyl chloride gas admitted to the vessel and the temperature raised until a pressure of 10–15 lbs. per square inch above atmospheric pressure is obtained at a temperature of 51° C. The suspension is agitated at this temperature and ethyl chloride admitted to maintain a pressure of 10–15 lbs. per square inch for 10–15 hours until .05 mole of ethyl chloride per $C_6H_{10}O_5$ mole of starch has reacted, as determined by the amount of alkali consumed in the suspension. The suspension is neutralized to pH 5.0 with hydrochloric acid, dewatered to a solid cake on a vacuum filter, washed free of salt, and dried to around 10% moisture. The product is obtained in the original granule form. On heating a neutral, water suspension the ethyl granule starch starts to gelatinize at a somewhat lower temperature than does regular unmodified corn starch, and on continued heating it forms a cohesive, comparatively translucent paste, which on cooling has considerably reduced retrogradation tendency and remains fluid and translucent in concentrations at which a regular, unmodified corn starch paste sets to a firm, opaque gel.

*Example III*

To a 43.5% dry substance suspension of unmodified corn starch in water is added 15% by weight of sodium chloride based on the water in the suspension. A cool, aqueous 20% solution of sodium hydroxide containing 5% by weight of NaOH based on starch solids in the suspension is added with sufficient agitation to insure rapid dispersion of the alkali throughout the suspension. Three percent by weight of normal propyl chloride based on starch solids is added to the suspension and the suspension is then agitated in a closed vessel at 51° C. for 20–24 hours until .04 mole of n-propyl chloride per $C_6H_{10}O_5$ mole of starch has reacted, as determined by the amount of alkali consumed. The suspension is then neutralized to pH 5.0 with HCl, dewatered to a solid cake on a vacuum filter, washed free of salt and dried to 10% moisture. The product is obtained in the original granule form. On heating a neutral water suspension of the n-propyl starch it forms a paste with greatly increased cohesiveness and translucency as compared with pastes of regular, unmodified corn starch, and which on cooling has greatly lowered retrogradation and gelling tendencies and remains fluid and translucent to concentrations at which a regular unmodified corn starch paste sets to a firm opaque gel.

*Example IV*

The process described in Example III is conducted using 20% by weight of sodium chloride based on the water in the suspension, a 30% sodium hydroxide solution containing 5% NaOH based on starch solids in the suspension, 4% by weight of n-amyl chloride based on starch solids, and a reaction temperature of 60° C. The suspension is agitated at this temperature for 20–30 hours until .02 mole of n-amyl chloride per $C_6H_{10}O_5$ mole of starch has reacted, as measured by the alkali consumed. The suspension is then neutralized with HCl, dewatered to a solid cake on a vacuum filter, washed free of salt, and dried. The product is obtained in the original granule form. On heating a neutral suspension of the product in water it gelatinizes to form a translucent, somewhat cohesive paste which on cooling remains in a smooth spreading condition.

*Example V*

To a 43.5% dry substance suspension of unmodified corn starch is added a mixture of 30% sodium hydroxide and 26% sodium chloride containing 3% by weight of NaOH based on starch and 10% by weight of NaCl based on water in the suspension while agitating the suspension vigorously. Then 2.8% by weight of sodium monochloracetate based on starch solids is added and the suspension agitated at 45° C. for 20–30 hours until .035 mole of sodium chloracetate per $C_6H_{10}O_5$ mole of starch has reacted, as measured by the amount of alkali consumed during the reaction. The suspension is neutralized to pH 5.0 with sulfuric acid, dewatered to a solid cake on a vacuum filter, washed free of salt and dried. The product is obtained in the original granule form. On heating a neutral suspension of the product in water it starts to gelatinize at 61° C. to 62° C. and on continued heating it forms an exceptionally translucent, cohesive paste with exceptionally high viscosity which on cooling has negligible retrogradation tendency and which remains fluid and translucent in concentrations at which regular unmodified corn starch pastes set to firm, opaque gels. A 1% solids suspension of this product in water when heated forms an almost clear, viscous paste while untreated, unmodified corn starch must be cooked in at least a 3% solids concentration in order to produce equivalent paste viscosity.

*Example VI*

To a 41.8% dry substance suspension of unmodified corn starch is added 20% by weight of sodium chloride based on the water in the suspension. A cool, aqueous 30% solution of sodium hydroxide containing 5% by weight of NaOH based on the starch solids in the suspension is added with sufficient agitation to insure rapid dispersion of the alkali throughout the suspension. Then 3.9% by weight of benzyl chloride based on starch solids is added and the suspension agitated at 60° C. for 10 to 20 hours until substantially all of the benzyl chloride has reacted, as determined by the amount of alkali consumed during reaction. The suspension is neutralized with acid, dewatered to a solid cake on a vacuum filter, washed free of salt, and dried. The product is obtained in the original granule form. When this product is heated in a neutral suspension in water it starts to gelatinize at 60–61° C. and on continued heating forms a paste with greatly increased translucency and cohesiveness as compared with pastes of regular unmodified starch and which on cooling has considerably reduced gelling and retrogradation tendencies.

*Example VII*

To a 38% solids water suspension of high grade, high viscosity tapioca starch is added 5% by weight of sodium bromide based on the water. A cool, 26% KOH solution containing 3.5% by weight of alkali based on the starch is added slowly while agitating the suspension sufficiently to prevent localized swelling of the starch by the alkali. Then 0.45% by weight of potassium monochloracetate is added, and the suspension agitated at 51° C. for 10–20 hours until .005 mole of potassium monochloracetate per $C_6H_{10}O_5$ mole of starch has reacted, as determined by the amount of alkali consumed during the reaction. The suspension is then neutralized to pH 6.0 with hydrochloric acid, dewatered in a vacuum filter, washed free of salt, and dried. The product is obtained in the original granule form. On heating a neutral water suspension the product forms a paste with higher hot and cold paste viscosity than does the original, untreated tapioca starch.

*Example VIII*

To a 43.5% solids suspension of unmodified corn starch is added 5% by weight of sodium chloride based on the water. A cool 10% NaOH solution containing 3% by weight of sodium hydroxide based on the starch is added slowly while agitating the suspension sufficiently to prevent localized swelling of the starch by the alkali. Then 2.5% by weight of allyl chloride is added and the suspension agitated at 38° C. for 15–25 hours until .03 mole of allyl chloride per $C_6H_{10}O_5$ mole of starch has reacted, as determined by the amount of alkali consumed during the reaction. The suspension is then neutralized with acid, dewatered on a suction filter, and the product washed thoroughly with water, and dried. The product is obtained in the original granule form. On heating a neutral water suspension this product starts to gelatinize at a temperature several degrees lower than does untreated corn starch and on continued heating forms a cohesive, translucent paste, which on cooling retains its cohesiveness and has negligible tendency to set to a semi-solid on aging. The ungelatinized granules of the product combine with bromine by direct addition and rapidly decolorize potassium permanganate solution at 26° C.

*Example IX*

To a 42.6% starch solids suspension of an acid-modified, medium-fluidity corn starch taken from thin-boil conversion tanks just prior to filtering and drying is added a mixture of 26% sodium chloride and 30% sodium hydroxide solutions containing 5% NaCl based on the water in the starch suspension and 2.5% NaOH based on the starch in the suspension. Then 2.7% by weight of sodium monochloracetate is added and the suspension is agitated at 51° C. for 15 to 24 hours until .032 mole of sodium monochloracetate per $C_6H_{10}O_5$ mole of starch has reacted, as determined by the amount of alkali consumed during the reaction. The suspension is then neutralized with acid, dewatered in a suction filter, washed free of salt, and dried. The product is obtained in the original granule form. On heating a neutral water suspension this product gelatinizes at a temperature several degrees lower than normal gelatinization temperature of the original untreated starch. On continued heating it forms a cohesive, translucent paste having considerably higher viscosity than pastes of the original untreated starch in the same concentration. A 10% solids cooked paste of this product flows when cooled to 27° C., while a 10% cooked paste of the original untreated starch sets to a rigid gel when cooled.

While in the foregoing specification specific embodiments of the process of this invention have been discussed in detail, it will be apparent to those skilled in the art that many of the details set forth can be varied widely without departing from the spirit of the invention.

We claim:

1. In a method of producing partially etherified, filterable, granule starch, the step of reacting unswollen, granule starch with a monochlorine substituted organic etherifying agent reacting monofunctionally with starch and in which the chlorine atom is attached to a single-bonded carbon atom in an aliphatic chain, said etherifying agent being free of hydroxyl and epoxy groups, said reaction being carried out in an alkaline aqueous reaction medium in the presence of a sufficient amount of an alkali metal salt capable of inhibiting gelatinization of starch so that said starch remains filterable during the course of said reaction, said alkali metal salt being selected from the group consisting of sodium, potassium, and lithium, chlorides, carbonates, acetates, nitrates and sulfates.

2. The step of claim 1 in which said etherifying agent has the characteristics designated in claim 1 and in addition is selected from the group consisting of saturated alkyl chlorides containing from 1 to 5 carbon atoms and unsaturated alkyl chlorides containing from 3 to 5 carbon atoms.

3. The step of claim 1 in which said etherifying agent is further characterized as a monochlorine substituted saturated fatty acid salt reacting monofunctionally with starch and in which the chlorine atom is attached to a single-bonded carbon atom.

4. In a method of producing partially etherified, filterable granule starch, the steps of reacting unswollen, granule starch with a monochlorine substituted organic etherifying agent reacting monofunctionally with starch and in which the chlorine atom is attached to a single-bonded carbon atom in an aliphatic chain, said etherifying agent being free of hydroxyl and epoxy groups, said reaction being carried out by mixing said etherifying agent with an aqueous suspension of said starch while maintaining said aqueous suspension at a temperature ranging from 25 to 65° C., said starch suspension containing an alkali metal hydroxide and an alkali metal salt selected from the group consisting of sodium, potassium and lithium hydroxides and salts, and regulating the concentrations of said alkali metal hydroxide and said alkali metal salt to promote said reaction while substantially preventing the swelling of said starch during the course of said reaction so that said starch remains filterable as it is etherified, said alkali metal salt being selected from the group consisting of chloride, carbonate, acetate, nitrate and sulfate salts of said alkali metals.

5. The method steps of claim 4 in which said alkali metal salt is a chloride.

6. The method steps of claim 4 in which said alkali metal salt is a carbonate.

7. The method steps of claim 4 in which said alkali metal salt is an acetate.

8. The method steps of claim 4 in which said alkali metal salt is a nitrate.

9. The method steps of claim 4 in which said alkali metal salt is a sulfate.

10. In a method of producing partially etherified, filterable granule starch, the steps of preparing an aqueous suspension of unswollen, granule starch containing from 1.3 to 2.3 parts by weight of water to each part by weight of starch, said aqueous suspension having dissolved therein an alkali metal hydroxide capable of promoting an etherification reaction and an alkali metal salt capable of inhibiting gelatinization of starch during the course of such a reaction, said alkali metal hydroxide and said alkali metal salt being selected from the group consisting of sodium, potassium and lithium hydroxides and salts, said alkali metal hydroxide being present in the range from about 0.1 to about 0.28 mole of hydroxide per $C_6H_{10}O_5$ mole of starch, said alkali metal salt being further selected from the group consisting of chloride, carbonate, acetate, nitrate, and sulfate salts of said alkali metals, said alkali metal salt being present in the range from about 1 to 6 parts by weight of said salt per part of alkali metal hydroxide, and reacting said unswollen, granule starch with a monochlorine substituted organic etherifying agent reacting monofunctionally with starch and in which the chlorine atom is attached to a single-bonded carbon atom in an aliphatic chain, said etherifying agent being further characterized as being a compound selected from the group consisting of saturated alkyl chlorides containing from 1 to 5 carbon atoms and unsaturated alkyl chlorides containing from 3 to 5 carbon atoms, said reaction being carried out by mixing said etherifying agent with said starch suspension and heating said suspension to a temperature between about 25° to 65° C. to partially etherify said unswollen granule starch without swelling starch to an unfilterable condition, said etherifying agent being reacted with said starch in an amount between about 0.005 to 0.15 mole of etherifying agent per $C_6H_{10}O_5$ mole of starch.

References Cited in the file of this patent

UNITED STATES PATENTS

| | | |
|---|---|---|
| 2,116,867 | Kreimeier et al. | May 10, 1938 |
| 2,516,633 | Kesler et al. | July 25, 1950 |
| 2,524,792 | Hamilton et al. | Oct. 10, 1950 |
| 2,733,238 | Kerr et al. | Jan. 31, 1956 |